L. J. LE PONTOIS.
ELECTRIC GENERATOR.
APPLICATION FILED MAY 18, 1911.

1,223,704.

Patented Apr. 24, 1917.
5 SHEETS—SHEET 1.

Fig. 1.

Witnesses
Edwin L. Bradford
Geo. B. Pitts

Inventor
Leon J. Le Pontois
By
Edward T. Alexander
Attorney

L. J. LE PONTOIS.
ELECTRIC GENERATOR.
APPLICATION FILED MAY 18, 1911.

1,223,704.

Patented Apr. 24, 1917.
5 SHEETS—SHEET 3.

Witnesses
Edwin L. Bradford
Geo. B. Pitts

Inventor
Leon J. Le Pontois
By
Edward R. Alexander
Attorney

UNITED STATES PATENT OFFICE.

LEON J. LE PONTOIS, OF CLEVELAND, OHIO, ASSIGNOR, BY MESNE ASSIGNMENTS, TO THE TEAGLE COMPANY, OF CLEVELAND, OHIO, A CORPORATION OF OHIO.

ELECTRIC GENERATOR.

1,223,704.

Specification of Letters Patent.

Patented Apr. 24, 1917.

Application filed May 18, 1911. Serial No. 627,927.

*To all whom it may concern:*

Be it known that I, LEON J. LE PONTOIS, citizen of the Republic of France, residing at Cleveland, in the county of Cuyahoga and State of Ohio, have invented certain new and useful Improvements in and Relating to Electric Generators, of which the following is a specification.

This invention relates to improvements in electric generators, more particularly to inductor alternators especially adapted for use in connection with internal combustion engines.

I have sought to cheapen the cost of production and increase the efficiency of the class of devices to which my invention relates.

For the purpose of illustration I have selected to illustrate and herein described one form of electric generator embodying my invention.

1 indicates as an entirety a rectangular field magnet frame. In the illustrated embodiment of my invention it preferably comprises a combined base and pole piece 2, having a polar face $2^b$, an upper pole piece 3 and end plates 4 and 5 of non-magnetic material. The pole piece 3 has a polar projection $3^a$ with a polar face $3^b$ and a combined core and polar projection 6, the core proper being indicated by $6'$ and the polar projection by $6^a$, $6^b$ being the polar face of the polar projection $6^a$. Near either end the element 6 is preferably reduced in size to form circular extensions $6^d$, $6^e$, the former of which snugly engages the walls of a passage $4^a$ in the end plate 4, while the projection $6^e$ snugly engages the walls of a passageway $5^a$ through the end plate 5. The portion $6^f$ of the element 6 is cylindrical in shape and snugly engages the walls of a passage-way $3^c$ through the polar projection $3^a$. The parts above referred to may be assembled in said rectangular field magnet frame 1, and the same may then be bored to receive a rotor between the polar faces $3^b$, $6^b$ and the opposite polar face $2^b$ of the base 2, and the end plates may be bored at the same time to receive the anti-friction bearings 7 and 8.

9 indicates as an entirety an inductor rotor mounted in the said bearings 7 and 8 to turn about the longitudinal axis of the polar faces $2^b$, $3^b$ and $6^b$. The inductor rotor illustrated in the drawings comprises a center disk $9'$ of nonmagnetic material on opposite sides of which with their respective axes at right angles to each other are flux distributing sections $9^a$, $9^b$, each composed of a plurality of laminæ of suitable metal rigidly secured in place and to the disk $9'$. Those constituting the section $9^a$ are rigidly secured between the disk $9'$ and an end plate 10 by means of screw rods 11, 11, the outer ends of which may be upset or riveted in countersunk openings in the plate 10. Likewise the section $9^b$ is held in position by means of screw rods 11, 11, extending into the disk $9'$ and through a plate 12 in which their outer ends may be riveted or upset. $10'$ is a shaft extending forward from the plate 10. It may be rigidly secured to the latter or formed integral therewith as desired. At $10^a$ it is shaped and proportioned to snugly fit the inner ring of the bearing 7. $12'$ is a shaft extending rearwardly from the plate 12. It may be formed integrally therewith or be rigidly secured thereto as desired. At $12^a$ it is shaped and proportioned to snugly fit the inner ring of the bearing 8. This mounting for the inductor rotor insures that it will turn freely between the polar faces of the pole pieces on opposite sides of its longitudinal axis.

14 indicates permanent magnets arranged at either side of the rectangular frame 1, and having their upper ends suitably connected in consequent pole relation with the pole piece 3 and their lower ends suitably connected in consequent pole relation with the pole piece 2. These magnets I have illustrated as being of the lamina type. Groups of the laminæ are connected together by lamina connectors 15 which in the drawings comprise a central enlarged portion 15' from opposite sides of which extend rods 15ª. The laminæ are punched near their ends to receive these rods 15ª, and a plurality of laminæ are assembled on each of said rods and bound together by a screw threaded piece 15ᵉ at the end of each rod. The center piece 15' of each of the magnet connectors 15 is drilled to receive screws 16, which enter screw-threaded holes in the sides of the pole pieces 2 and 3 and firmly hold the magnets in place thereagainst.

Figures 5, 6, 13:
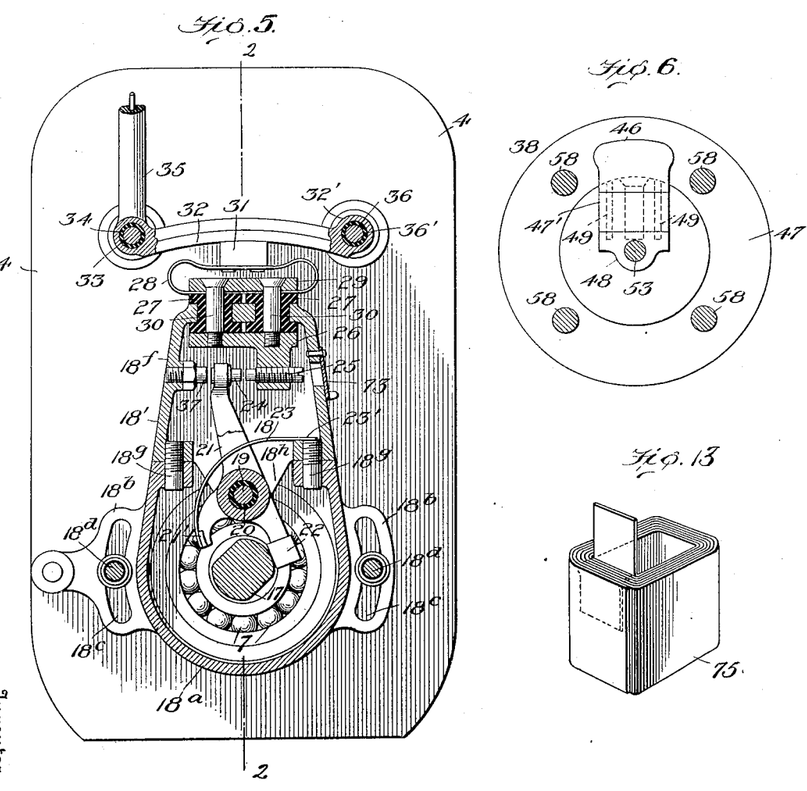
Fig. 5 is a section on the line 5—5 Fig. 2.
Fig. 6 is a section on the line 6—6 Fig. 2.
Fig. 13 is a perspective view of one of the coils on the permanent magnet illustrating its construction.
Figure 7:
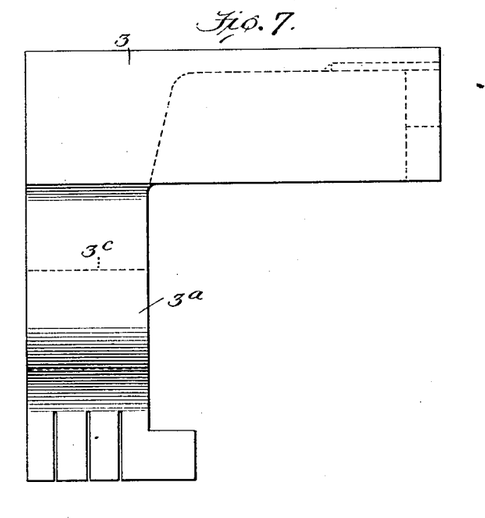
Fig. 7 is a side elevation of the upper pole piece detached.
Figure 8:
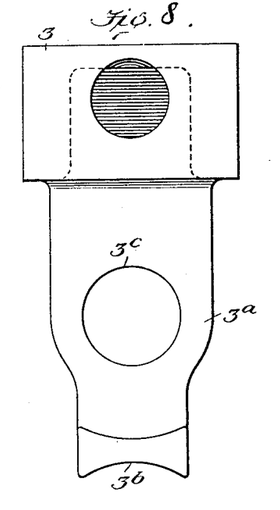
Fig. 8 is an end elevation of the same.
Figure 9:
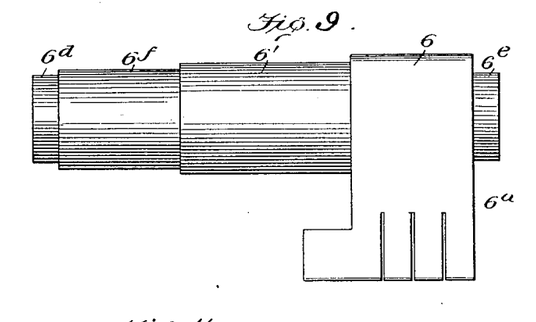
Fig. 9 is a side elevation of the combined core and polar projection detached.
Figure 10:
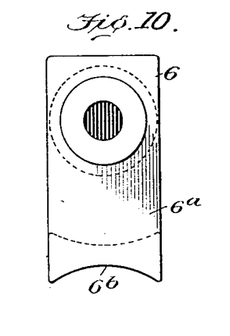
Fig. 10 is an end elevation of the same.

17 is a cam which may be formed integrally with or be rigidly secured to the front end of the inductor shaft 10'. It serves to operate a suitable circuit opening and closing mechanism for the primary circuit of the apparatus. This circuit closing and opening mechanism for the primary circuit of the magneto is indicated as an entirety by 18. 4ᵇ is an outwardly extending annular shoulder on the end plate 4. 18' is a two-part breaker box, at its inner side loosely mounted on the shoulder 4ᵇ, so as to be free to turn thereon. The lower part 18ª of this breaker box carries laterally extending wings 18ᵇ, each having a curvilinear opening 18ᶜ therethrough which lies in the arc of a circle struck from the axis of the inductor rotor shaft as a center. 18ᵈ are pins carried by the end plate 4. Each extends through the adjacent curvilinear passage-way in the breaker box, and serves to limit the angular movement of the breaker box about the axis of the inductor rotor. 18ᵉ are nuts engaging the outer ends of the pins 18ᵈ. The upper part 18ᶠ of the breaker box is detachably connected to the lower part 18ª by means of a couple of dowel pins 18ᵍ carried by the upper part and arranged to enter vertically disposed passage-ways in the lower part, the arrangement being such that when the two parts of the breaker casing are in normal position, they can only move relative to each other in the direction permitted by the dowel pins 18ᵍ. 18ʰ are downward extensions of the upper part 18ᶠ of the breaker casing, they lying opposite to each other and being arranged to enter the lower part 18ª of the casing when in normal assembled position. 19 is a shaft extending between the projections 18ʰ, 18ʰ. 20 is a fiber insulating bushing surrounding the shaft 19 between the breaker casing extensions 18ʰ, 18ʰ. 21 is a breaker arm mounted upon the insulating bushing 20 to oscillate about the axis of the shaft 19. At its lower end this arm carries a fiber block 22 arranged to engage with the cam surface of the breaker cam 17. 23 is a spring detachably connected at 23' to the upper part 18ᶠ of the breaker casing. At its lower end this spring 23 is connected with an ear 21' on the breaker arm, in such manner as to serve to normally tend to force the breaker arm in clockwise direction about the axis of the shaft 19 as viewed in Fig. 5. At its upper end the breaker arm carries a movable electrode 24 which is arranged to engage with an adjustable electrode 25 carried by the plate 26 which is suitably insulated from the breaker casing. This insulation I have shown to be accomplished by means of a couple of insulating spools 27 extending through the top of the upper portion 18ᶠ of the breaker housing. 28 is a contact spring looped at either end and having its free ends bent under a plate 29, which latter is secured to the plate 26 by means of screws 30 passing through the insulating spools 27. 31 is a copper contact block secured to the upper side of the spring 28. It is arranged to move in contact with the under surface of a contact segment 32 mounted at one end on a stud 33 carried by the front end plate 4 of the magneto and suitably insulated therefrom by means of an insulating bushing 34.

35 is a terminal connector mounted on the insulating bushing 34 and held in electrical contact with the segment 32 by means of a thumb nut 33' on the stud 33. 36 is a stud carried by the end plate 4 and having an insulating bushing 36' thereon with which the end 32' of the contact segment 32 is arranged to engage and with which it may be held in position by means of a thumb nut 36ª on the stud 36. By backing up on the thumb nuts 33' and 36ª the ends of the contact segment 32 may be freed and removed from the studs 33 and 36 in order to permit the detachment of the upper portion 18ᶠ of the breaker casing from the lower portion 18ª thereof.

37 is a fiber buffer suitably mounted within the part 18ᶠ of the breaker casing so as to be engaged by the upper free end of the breaker arm 21.

38 indicates as an entirety a distributer mechanism. Any suitable well known distributer mechanism may be employed. The one illustrated is the one now preferred by me for the purpose. The rear end of the end plate 5 is recessed at 5ᵇ to receive a driving gear 39 for the distributer mechanism, which gear is rigidly connected to the rear end of the inductor rotor shaft 12. A thrust bearing 40 carried by a detachable cap 41 may be inserted in the end plate 5 as illustrated. 42 is the driven gear of the distributer, mounted on anti-friction bearings 43, 43 carried by the stub shaft 44 which has a screw threaded connection with the rear end of the element 6.

45 is a spacing collar between the anti-friction bearings 43, 43. 46 is a movable distributer segment. It is insulated from the driven gear 42 by the insulating block 47 which has a forward extension or shoulder 47'.

48 is a contact socket which, with the movable distributer segment 46 is connected to the shoulder 47' and the insulating block 47 by means of screws 49.

50 is a combined distributer block and cap. On its inner side it is shaped to engage the adjacent walls of the end plate 5 and may be secured to the said end plate by means of thumb nuts 51, 51, each of which engages a rearwardly extending screw threaded rod 52 carried by the end plate 5. 53 is a brush, mounted in the brush receptacle 54 in the distributer cap 50. The inner end of this brush 53 enters the contact socket 48, and the brush is normally pressed into this contact socket by means of a spring 55. 56 is a contact terminal, which is electrically connected with the brush receptacle 54 by means of a rod 57. 58 are the distributer brushes or contacts carried by the distributer block 50. There are as many of them as required for the purpose for which the distributer is intended. I have shown four in the illustrated embodiment of my invention. Each comprises an inner surface 57' arranged closely adjacent to the path of travel of the movable distributer segment 46 and an embedded section (not shown) which has a passage-way therethrough to receive the contact terminal (not shown) of one of the distributer leads 60. The distributer brushes 58, contact terminals 56, rod 57 and brush receptacle 54 may be molded within the distributer block or cap 50 of suitable insulating material, when the same is formed.

61 is a generating coil. It is illustrated as comprising a section 61' of relatively coarse wire constituting a primary winding and a section 61$^a$ of relatively fine wire constituting a secondary winding and is mounted upon the core 6'. The distributer contact terminal 56 fits into a terminal socket 62 mounted in an insulating rod 63 carried by and extending through a passage-way 5$^c$ in the end plate 5. The socket 62 is electrically connected by a rod 64, extending through the hard rubber rod 63 to a flat strip of nickel 65 which has an enlarged portion 65' the upper surface of which is serrated as indicated at 65$^a$. 66 is a nickel plate carried by the pole piece 3 and disposed immediately above the tooth portion 65$^a$, the gap between this tooth portion and the nickel plate 66 constituting a safety air gap for the circuit. The end of the secondary winding is connected to a terminal socket 67 which is embedded in a hard rubber cap 68 suitably secured to the periphery of the coil. 69 is a contact terminal detachably fitted into the terminal socket 67. 70 is a screw for holding the free end of the nickel strip 65 in electrical contact with the contact terminal 69. This screw is accessible through an opening 70' directly above it in the pole piece 2.

71 is a condenser. I have shown it as positioned on the combined polar projection and the core 6, where it may be held in any suitable manner. It is connected into the circuit in parallel with the breaker electrodes 24 and 25 and so proportioned as to tend to overcome any sparking between such electrodes when the contact is broken between them.

Figure 11:
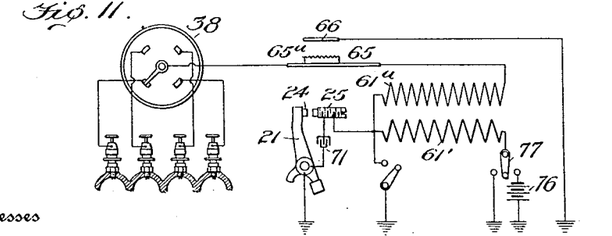
Fig. 11 is a diagrammatic view of a circuit in which the generator disclosed in the drawings may be employed.
Figure 12:
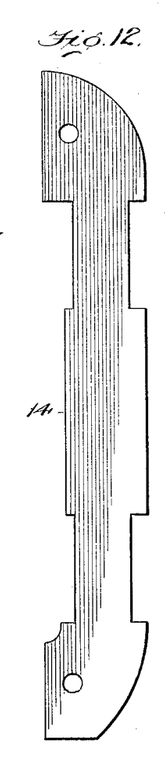
Fig. 12 is a side elevation of one of the magnet laminæ detached.

As illustrated in the diagram in Fig. 11 the primary winding 61' is connected in a circuit the opening and closing of which is controlled by the operation of the breaker arm 21. In the circuit of the secondary winding the distributer is arranged and also the spark gaps across which the current induced in the secondary is periodically caused to pass during the operation of the machine. Like poles of the magnets on opposite sides of the rectangular field structure are arranged opposite to each other.

Figure 1:
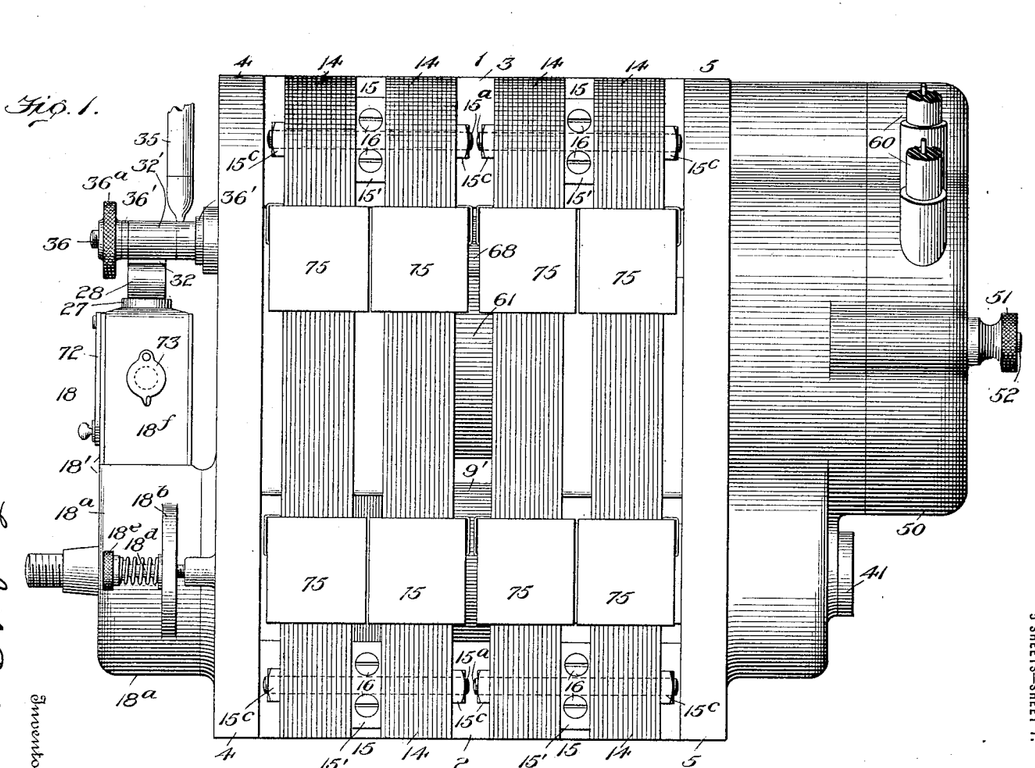
Figure 1 is a side elevation of an electric generator embodying my invention.
Figure 2:
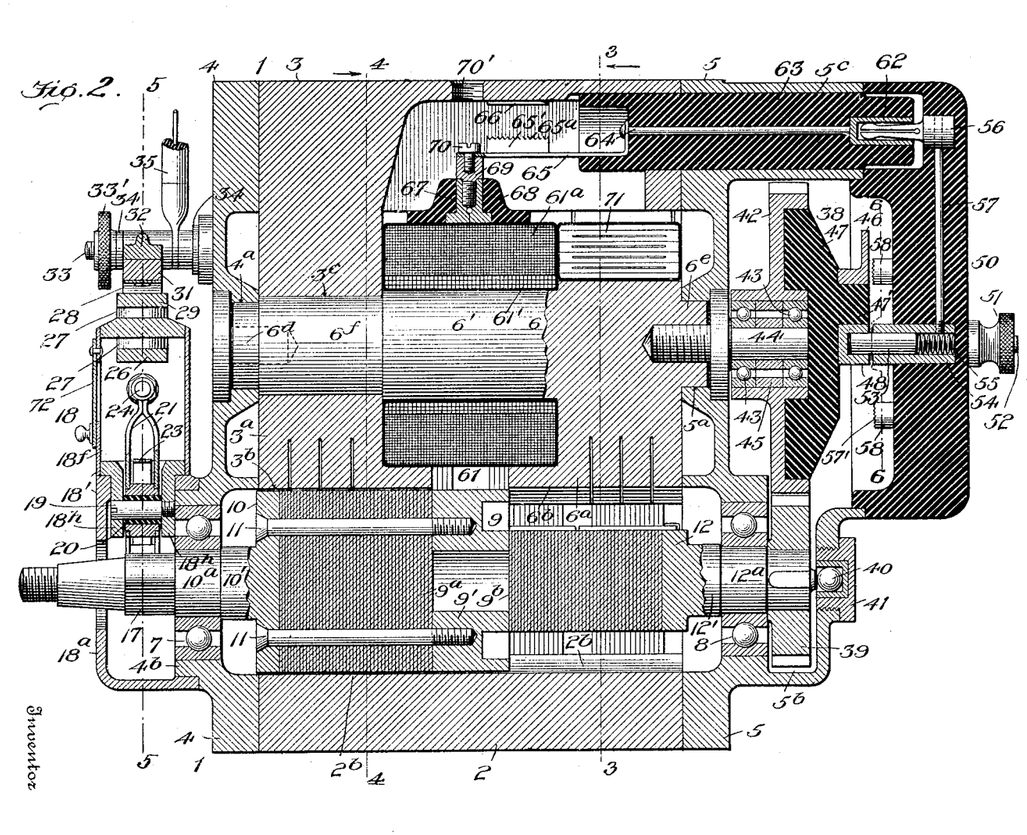
Fig. 2 is a section on the line 2—2 Fig. 5.
Figure 3:
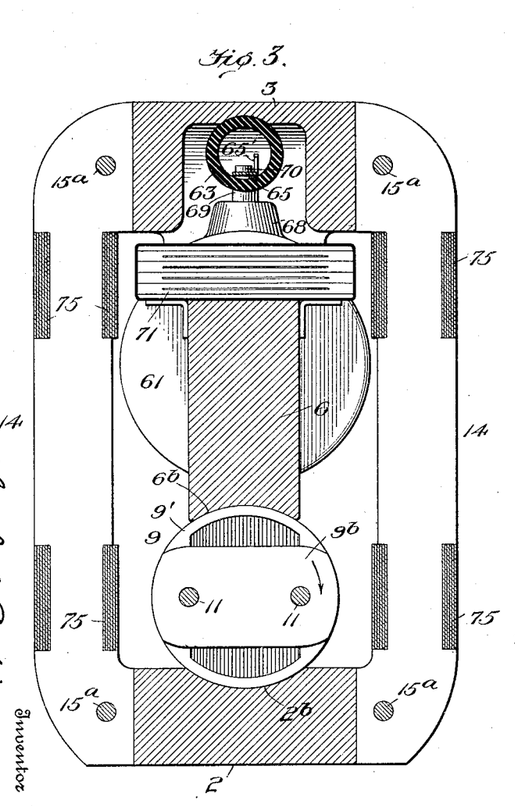
Fig. 3 is a section on the line 3—3 Fig. 2.
Figure 4:
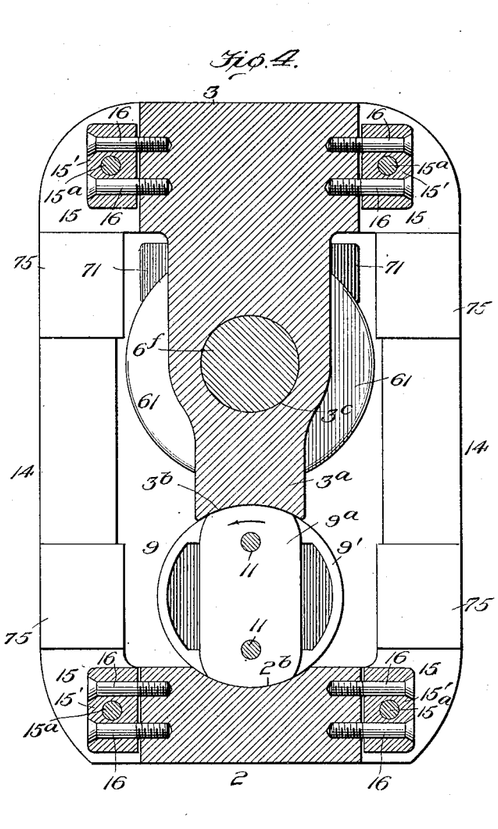
Fig. 4 is a section on the line 4—4 Fig. 2.

The operation of the generator will be readily apparent to those skilled in the art from a mere inspection of the drawings. Assuming that the inductor rotor 9 occupies the position illustrated in Fig. 4 with the flux distributing section 9$^a$ establishing a path of least magnetic reluctance between the polar face 2$^b$ and the polar face 3$^b$, the magnetic flux of the magnetic circuit is then concentrated across this path between the pole pieces and outside of the coil 61. As the inductor is rotated in the direction illustrated by the arrow in this figure, the reluctance to the passage of the magnetic flux between the polar faces 2$^b$ and 3$^b$ increases, whereas at the same time the reluctance to the passage of flux between the polar faces 2$^b$ and 6$^b$ is decreasing. This will continue until the flux distributer section 9$^b$ coöperating with the polar faces 2$^b$ and 6$^b$ affords a path of lower reluctance than exists between the polar faces 2$^b$ and 3$^b$ and the magnetic flux of the field will be attracted through the core 6' and coil 61. The circuit opening and closing mechanism 18 is so timed that during the period when the magnetic flux density through the coil 61 is increasing, the primary circuit is open and no current flows. Upon continued rotation of the inductor the distributer section 9$^a$ will come to again afford a path of lower magnetic reluctance between the polar faces 2$^b$ and 3$^b$, than the distributer section 9$^b$ affords between the polar faces 2$^b$ and 6$^b$ which change will be accompanied by a decrease of magnetic flux density in the coil 61 and after this decrease in magnetic flux density in the coil 61 has started, the primary circuit may be closed at the electrodes 24 and 25, since the current due to decrease of magnetic flux density through the coil will exert a magnetizing rather than a demagnetizing influence upon the permanent magnets. At any time during the existence in the primary circuit of this current due to flux decrease in the coil, and preferably, of course, as near the peak of the wave as possible, the electrode 24 may be caused to move away from the electrode 25, thereby breaking the primary circuit and inducing in the secondary windings a sufficient voltage to cause an electric spark to pass between the electrodes of one of the spark gaps in the secondary circuit.

As I have stated above, the currents induced in the generating windings always have a magnetizing rather than a demagnetizing influence upon the permanent magnets, or, in other words, the magneto-motive forces generated by the currents induced in the generating windings always act with rather than against the magneto-motive force of the permanent magnets, because the generating windings are fixed in relation to the permanent magnets and the operation of the breaker is so timed that the currents in the generating windings are always induced by a decrease of the magnetic flux density through said windings. This characteristic of the generator not only tends to maintain the maximum efficiency and capacity of the generator, but makes possible also certain structural advantages. That is to say, by reason of this characteristic of the magnetic circuit I have found it possible to use permanent magnets of a length not exceeding the permissible height of ignition current generators complying with standardization requirements as to dimensions. In other words, I am thus enabled to use permanent magnets of straight bar form as compared with the longer horseshoe type of magnets which has heretofore been used in generators of the character to which my invention relates. The straight bar form of magnet is obviously less expensive and, when of permissible length, better lends itself to structural requirements than the horse-shoe type of magnet.

This relation of the magnetizing action of the induced currents of the generator to the form of magnet used, to which I have just referred, is made the basis of claims in my co-pending application Serial No. 158,094, filed March 28, 1917, rather than in the present application as my understanding is that the Patent Office looks upon this subject-matter, involving as it does the breaker mechanism, as constituting an invention separate from that claimed herein.

The rectangular nature of the magnet frame provides for rigidity of the resulting structure. The coil 61 being circular in form admits of the cheapest possible coil construction. Where high tension current is desired the coil may be provided as above described with both a primary and a secondary winding. Where low tension current is desired, it will be understood that the coil may readily be wound to suit the demands in this particular.

Ordinary adjustment or cleaning of the electrodes 24 and 25 may be readily accomplished by swinging the pivoted cap 72 on the casing member 18ᶠ so as to expose to the eye the said electrodes through the opening in such casing part. This may be done while the generator is in operation, if desired. The pivoted cap 73 at the side of the casing part 18ᶠ may be swung open so as to expose the end of the adjustable electrode 25. By means of a screw driver inserted through the passage-way under the cap 73 movable electrode 25 may be adjusted as desired. Should the breaker mechanism require attention which cannot be readily given to it in the manner just described, the thumb nuts 33′, 36ᵃ may be backed up and the segment 32 removed from the studs 33 and 36, whereupon by simple endwise movement upwardly, the breaker casing part 18ᶠ and all of the breaker mechanism parts carried thereby may be simultaneously removed intact.

All of the principal parts of the distributer mechanism are readily accessible, this being accomplished merely by the removal of the thumb screws 51, 51, and the detachment of the distributer cap 50. This cap is so shaped and fitted to the end plate 5 as to provide a substantially water-proof distributer structure.

The breaker box 18′ may be angularly adjusted about the axis of the inductor rotor 9, to vary the period of interruption of the primary circuit.

It will be understood that instead of rotating the inductor rotor it may be oscillated to effect the change of magnetic flux density in the generating winding.

In contemplating my improved structure in its broadest sense the pole piece 3, polar projection 3ᵃ and combined core and polar projection 6 may be considered as a single element or as a pole piece having a pair of polar projections each with a polar face.

75 are short circuited coils, each arranged adjacent to one end of a permanent magnet. In the illustrated embodiment of my invention I have shown each of these coils to consist of a plurality of turns of flat strip copper wound about one of the permanent magnets near one end thereof. Each of these coils is short circuited upon itself, so as to form a closed electric circuit adjacent to the end of the magnet. The purpose of these coils is to assist in maintaining the permanency of the magnets inasmuch as they tend to oppose magnetic flux pulsations in the magnets themselves and oppose flux leakage. It is my present opinion that in the construction illustrated these short circuited coils on the magnets are peculiarly advantageous, because of the fact that the circuit of the primary winding 61′ is only closed during periods of magnetic flux decrease therethrough.

To those skilled in the art of making electric generators of the class described, many alterations in construction and widely differing embodiments and applications of my invention will suggest themselves, without departing from the spirit and scope thereof. My disclosures and the description herein are purely illustrative, and are not intended to be in any sense limiting.

In the circuit illustrated in diagram in Fig. 11, 76 indicates a battery. It will be understood that a suitable circuit closer or a switch diagrammatically illustrated at 77 may be used for connecting the battery to the generating winding 61 and disconnecting it therefrom in order to get an initial spark for engine starting purposes, if desired, it being understood that the battery should be connected so as to send current through the generating winding 61 in such direction as not to demagnetize the permanent magnets.

In so far as the subject-matter hereinafter claimed is common with the disclosure made in my earlier application, Serial No. 596,117, filed December 7, 1910, I hereby elect to treat this application as a continuation of the said earlier one.

What I claim is:—

1. In an ignition current generator, the combination of a pair of pole pieces one of which carries a plurality of polar projections, each having a polar surface opposed to the polar surface of the other pole piece, a pair of end plates of non-magnetic material forming with said pole pieces a rigid field structure, magnets on opposite sides of said field structure and having their like poles disposed in consequent pole relationship to said pole pieces, a generating winding in inductive relation to one of said polar projections, and an unwound inductor rotor rotatably mounted at either end in the adjacent said end plate and shaped and correlated to said polar surfaces of said pole pieces alternately to establish for the flux from all said magnets a uni-directional flux path through said winding, and then a path outside of said winding, whereby the flux always traverses the said winding in the same direction.

2. In an ignition current generator, the combination of a pair of pole pieces one of which carries a plurality of polar projections, each having a polar surface opposed to the polar surface of the other pole piece, a pair of end plates of non-magnetic material forming with said pole pieces a rigid field structure, magnets on opposite sides of said field structure and having their like poles disposed in consequent pole relationship to said pole pieces, a generating winding in inductive relation to one of said polar projections, an unwound inductor rotor rotatably mounted at either end in the adjacent said end plate and shaped and correlated to said polar surfaces of said pole pieces alternately to establish first a path for the flux of all of the magnets between the polar face of the unwound polar projection and the polar surface of the opposing pole piece and outside of said generating winding, and then a path for the flux of all of the magnets through said generating winding and between the polar surface of said wound polar projection and the polar surface of the opposing pole piece.

3. In an ignition current generator, the combination of a pair of iron pole pieces, one of which carries a plurality of polar projections, each having a polar surface opposite to the polar surface of the other pole piece, a pair of end plates of non-magnetic material forming with said pole pieces a rigid field structure, a generating winding in inductive relation to one of said polar projections, magnets on opposite sides of said field structure and having their like poles connected to the same pole piece, and an unwound inductor rotor mounted near either end in the adjacent one of said end plates and having polar surfaces shaped and correlated to the polar surfaces of said pole pieces to establish alternately an iron path for the flux of all of said magnets outside said generating winding and then an iron path through said generating winding for the flux of all of said magnets, whereby the flux always traverses the said winding in the same direction.

4. In an ignition current generator, the combination of a generating winding, a pair of iron pole pieces, one of which has a plurality of polar projections, one of said polar projections being detachably connected to said pole piece and carrying said generating winding, a pair of end plates of non-magnetic material forming with said pole pieces a rigid field structure, magnets on opposite sides of said field structure and having their like poles connected to the same pole piece, and an unwound inductor rotor mounted at either end in the adjacent one of said end plates and having polar surfaces shaped and correlated to the polar surfaces of said pole pieces to establish alternately an iron path for the flux of all of said magnets outside of said generating winding and then an iron path through said generating winding for the flux of all of said magnets, whereby the flux always traverses the said winding in the same direction, each of said magnets being removable from said rectangular frame structure without disassembling any other parts of the generator.

5. In an electric generator of the class described, a pair of pole pieces, one of said pole pieces having a pair of polar projections, a generating coil on one of said polar projections, an inductor rotor mounted to rotate between the polar faces of said polar projections and the opposite pole piece, said inductor rotor having a pair of flux distributing sections each of which has a long and a short axis with the long axis of one section arranged at an angle to the long axis of the other section, and permanent magnets on opposite sides of said pole pieces, each having one end connected to one of said pole pieces and its other end connected to the other of said pole pieces, the flux distributing sections of said inductor rotor being disposed to coöperate with the polar faces of said polar projections, respectively, to alternately establish paths of least magnetic reluctance through and then outside of said coil as the inductor rotor is rotated.

6. In an electric generator of the class described, a pair of pole pieces, one of said pole pieces having a pair of polar projections one of which polar projections is formed separately from said pole piece, a generating coil on one of said polar projections, an inductor rotor mounted to rotate between the polar faces of said polar projections and the opposite pole piece, said inductor rotor having a pair of flux distributing sections each of which has a long and a short axis with the long axis of one section arranged at an angle to the long axis of the other section, and permanent magnets on opposite sides of said pole pieces, each having one end connected to one of said pole pieces and its other end connected to the other of said pole pieces, the flux distributing sections of said inductor rotor being disposed to coöperate with the polar faces of said polar projections, respectively, to alternately establish paths of least magnetic reluctance through and then outside of said coil as the inductor rotor is rotated.

7. In an electric generator of the class described, a pair of pole pieces, one of said pole pieces having a pair of polar projections one of which polar projections is formed separately from said pole piece, a generating coil on said separately formed polar projection, an inductor rotor mounted to rotate between the polar faces of said polar projections and the opposite pole piece, said inductor rotor having a pair of flux distributing sections each of which has a long and a short axis with the long axis of one section arranged at an angle to the long axis of the other section, and permanent magnets on opposite sides of said pole pieces each having one end connected to one of said pole pieces and its other end connected to the other of said pole pieces, the flux distributing sections of said inductor rotor being disposed to coöperate with the polar faces of said polar projections, respectively, to alternately establish paths of least magnetic reluctance through and then outside of said coil as the inductor rotor is rotated.

8. In an electric generator, the combination of a pair of pole-pieces one of which carries a pair of inwardly extending polar projections disposed between its side walls, end plates of non-magnetic material forming with said pole pieces a rigid, rectangular field structure, permanent straight bar magnets arranged along the opposite sides of said field structure and each extending between the adjacent sides of said pole pieces, a current generating winding in said field structure, and an inductor rotor extending longitudinally of said field structure and rotatably mounted at either end in the adjacent end plate thereof, and shaped and arranged to periodically and successively form for the flux from all said magnets paths of least magnetic reluctance between said pole-pieces, first through one of said polar projections and then through the other one.

9. In an electric generator, the combination of a pair of oppositely disposed pole-pieces, one of which carries a pair of inwardly extending polar projections disposed between its side walls, end plates of non-magnetic material joining the ends of said pole pieces together to form a rigid rectangular field structure, permanent magnets arranged on both sides of said field structure and between the end plates thereof, the opposing magnets having their like poles making contact with the opposite sides of the same pole-pieces, a generating winding in said field structure, and an inductor rotor extending longitudinally of said field structure, rotatably mounted at either end in the adjacent end plate thereof, and shaped and arranged to periodically and successively shift the magnetic flux into and out of said generating winding.

10. In an electric generator, the combination of a pair of oppositely disposed pole-pieces, one of which carries a pair of inwardly extending polar projections disposed between its side walls, end plates of non-magnetic material joining the ends of said pole pieces together to form a rigid rectangular field structure, permanent magnets arranged on both sides of said field structure and between the end plates thereof, the opposing magnets having their like poles making contact with the opposite sides of the same pole-pieces, a generating winding in said field structure, and an inductor rotor extending longitudinally of said field structure, rotatably mounted at either end in the adjacent end plate thereof, and having a pair of flux-distributing sections bearing angular relation to each other relative to the axis of the inductor, said sections being arranged for successively establishing paths of least reluctance between first one and then the other of said polar projections and the opposite pole pieces.

11. A rotor for inductor generators comprising a section of high magnetic reluctance, flux distributing sections at either side thereof consisting of a plurality of laminæ, end plates for said flux distributing sections, rods joining said end plates, laminæ and section of material of high magnetic reluctance rigidly together, and shaft sections extending outwardly from each of said end plates.

12. In an electric generator, the combination of a pair of pole pieces one of which has a longitudinally disposed core, a pair of end plates of non-magnetic material forming with said pole pieces a rigid, rectangular field structure, magnets on opposite sides of said field structure having their like poles disposed oppositely to each other, an inductor rotor extending longitudinally of said field structure, rotatably mounted at either end in the adjacent end plates thereof and having a pair of flux distributing sections arranged with their long axes at an angle to each other, and a coil disposed within said field structure entirely at one side of said inductor rotor surrounding said core and with its axis parallel to the axis of the inductor rotor, said flux distributing sections of said inductor rotor serving to alternately establish paths of least magnetic reluctance through and then outside of said core as the inductor rotor is rotated.

In testimony whereof I affix my signature in the presence of two witnesses.

LEON J. LE PONTOIS.

Witnesses:
JOHN P. DEMPSEY,
EDWARD R. ALEXANDER.